United States Patent
Zee et al.

(10) Patent No.: US 10,433,226 B2
(45) Date of Patent: Oct. 1, 2019

(54) WLAN—3GPP INTERWORKING

(71) Applicant: Telefonaktiebolaget LM Ericsson (publ), Stockholm (SE)

(72) Inventors: Oscar Zee, Stockholm (SE); Tomas Hedberg, Stockholm (SE); Jari Vikberg, Järna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 310 days.

(21) Appl. No.: 15/117,851

(22) PCT Filed: Feb. 11, 2014

(86) PCT No.: PCT/EP2014/052591
§ 371 (c)(1),
(2) Date: Aug. 10, 2016

(87) PCT Pub. No.: WO2015/120876
PCT Pub. Date: Aug. 20, 2015

(65) Prior Publication Data
US 2017/0013525 A1    Jan. 12, 2017

(51) Int. Cl.
*H04W 36/14* (2009.01)
*H04W 36/00* (2009.01)
(Continued)

(52) U.S. Cl.
CPC ....... *H04W 36/14* (2013.01); *H04W 36/0061* (2013.01); *H04W 36/0094* (2013.01); *H04W 36/08* (2013.01); *H04W 84/12* (2013.01)

(58) Field of Classification Search
CPC ............. H04W 36/14; H04W 36/0061; H04W 36/0094; H04W 36/08
See application file for complete search history.

(56) References Cited

U.S. PATENT DOCUMENTS

2006/0245392 A1* 11/2006 Buckley ................ H04W 48/16
370/331
2006/0276190 A1* 12/2006 Shaheen ........... H04W 36/0061
455/436

(Continued)

OTHER PUBLICATIONS

3GPP TR 37.834 V12.0.0, 3rd Generation Partnership Project; Technical Specification Group Radio Access Network; Study on Wireless Local Area Network (WLAN)—3GPP radio interworking (Release 12), Dec. 2013, 18 pages.

(Continued)

*Primary Examiner* — Chi H Pham
*Assistant Examiner* — Weibin Huang
(74) *Attorney, Agent, or Firm* — Rothwell, Figg, Ernst & Manbeck, P.C.

(57) ABSTRACT

A method for achieving efficient usage of communication resources in a Wireless Local Area Network (WLAN) and a Radio Access Network (RAN), and a system executing the method are disclosed. The method comprises performing, by a user equipment (UE), measurements on a signal received from a WLAN control node, sending the measurements from the UE to a RAN control node, and sending, from the RAN control node to the UE, an instruction to send a probe signal to the WLAN control node. The method further comprises performing, by the WLAN control node, measurements on the probe signal, and determining whether or not the UE should be granted access to the WLAN.

28 Claims, 10 Drawing Sheets

(51) Int. Cl.
*H04W 36/08* (2009.01)
*H04W 84/12* (2009.01)

(56) References Cited

U.S. PATENT DOCUMENTS

| | | |
|---|---|---|
| 2008/0305825 A1 | 12/2008 | Shaheen et al. |
| 2013/0198817 A1* | 8/2013 | Haddad .................. H04L 63/18 726/5 |
| 2014/0071925 A1* | 3/2014 | Liu ...................... H04W 28/08 370/329 |
| 2014/0086211 A1* | 3/2014 | Liu ........................ H04L 45/38 370/331 |
| 2014/0204927 A1* | 7/2014 | Horn .................... H04W 76/16 370/338 |
| 2014/0269610 A1* | 9/2014 | Hiben .................. H04W 36/14 370/331 |
| 2015/0181491 A1* | 6/2015 | Van Phan ............. H04W 28/08 370/331 |
| 2015/0341821 A1* | 11/2015 | Hong .................... H04W 28/08 370/230 |
| 2016/0044567 A1* | 2/2016 | Baghel ................. H04W 28/08 370/331 |
| 2016/0182313 A1* | 6/2016 | Chen ................... H04L 41/5009 455/436 |
| 2016/0316405 A1* | 10/2016 | Balan ................... H04W 24/10 |

OTHER PUBLICATIONS

International Search Report and Written Opinion issued in related International Application No. PCT/EP2014/052591, dated Nov. 17, 2014, 14 pages.

Ruckus Wireless Inc., "How Interworking Works: A Detailed Look at 802.11u and Hotspot 2.0 Mechanisims," White Paper, Jul. 2013, 12 pages.

* cited by examiner

WLAN—3GPP INTERWORKING

CROSS REFERENCE TO RELATED APPLICATION(S)

This application is a 35 U.S.C. § 371 National Phase Entry Application from PCT/EP2014/052591, filed Feb. 11, 2016, designating the United States, the disclosure of which is incorporated by reference.

TECHNICAL FIELD

The present disclosure relates generally to methods and communication nodes in a wireless communication system comprising a wireless local area network, WLAN, and a radio access network, RAN, for efficient usage of communication resources in the WLAN and the RAN.

BACKGROUND

Operators of wireless communication networks have for a longer time used cellular (also called mobile) communication technologies like Global System for Mobile Communications, GSM, Code Division Multiple Access 2000, CDMA 2000, Wideband CDMA, W-CDMA and Long Term Evolution, LTE. In addition, the operators are also using Wireless Local Area Network communication technology, WLAN. The WLAN communication technology is typically based on the IEEE 802.11 standard. However, other similar standards may apply. The WLAN may also be called a Wi-Fi network. The operators are today mainly using WLAN to offload traffic from the mobile networks but the opportunity to improve end user experience regarding performance is also becoming more important. Most of current WLAN deployments are totally separate from the mobile networks, and are to be seen as non-integrated. The usage of WLAN is mainly driven due to the free and wide unlicensed spectrum, and the increased availability of WLAN in user equipments, UEs, like smart phones and tablets. The end users are also becoming more and more at ease with using WLAN for example at offices and homes. For these reasons, there is an interest of trying to integrate WLAN into mobile networks.

Exemplary methods for integrating WLAN in a radio access network, RAN, part of a mobile network are discussed in "Study on WLAN/3GPP radio interworking (Release 12), 3GPP TR 37.834 V12.0.0 (2014-018)". In the method called as "Solution 3", the decision for the UE to access WLAN is made by the RAN. A UE that is connected to a RAN and receives a signal from a predefined WLAN has been instructed to send to the RAN a measurement report comprising signal quality measurements performed on the signal received from the WLAN. Based on the reported WLAN measurements and possibly also RAN measurements and information such as available capacity in the RAN, the RAN may send a steering command message to the UE to perform access selection and/or traffic steering to the WLAN, i.e. to connect to the WLAN.

However, a drawback with such a method is that the WLAN signal quality measurements that the UE reports to the RAN are for downlink, DL, only. The WLAN uplink, UL, information is not available until the UE starts connecting to the WLAN. As separate transmitter/receiver pairs are used for UL and DL transmission, the UL and DL signal quality measurements may differ a lot and could therefore impact the decision whether the UE would finally be connected to the WLAN or not. If the UL signal quality is worse than the DL signal quality this may result in a final rejection of the UE to the WLAN during connection to the WLAN.

Consequently, there is a need for another way of integrating WLAN in RAN such that both UL and DL signal quality measurements for the WLAN are taken into consideration when deciding to connect a UE to a WLAN.

SUMMARY

It is an object of the invention to address at least some of the problems and issues outlined above. An object of the present invention is to make it possible for a UE communicating with a RAN to decide to connect to a WLAN based on current communication conditions in the WLAN in both uplink and downlink. Another object is to make a decision whether to connect to a WLAN or not for a UE connected to a RAN in a comparatively early stage in a connection procedure of the UE to the WLAN, alternatively after the UE has detected the WLAN but before a connection procedure is started. It is possible to achieve these objects and others by using a method and an apparatus as defined in the attached independent claims.

According to a first aspect, a method is provided performed by a wireless communication system comprising a Wireless Local Area Network, WLAN, and a radio access network, RAN, for efficient usage of communication resources in the WLAN and the RAN, the WLAN comprising a WLAN control node and the RAN comprising a RAN control node. The method comprises providing the RAN control node with a WLAN MAC-address of a user equipment, UE, connected to the RAN, sending, by the UE to the RAN control node, signal quality measurements performed by the UE on a downlink, DL, signal received from the WLAN control node, and sending, by the UE, an identity of the WLAN control node to the RAN control node. The method further comprises sending, by the RAN control node, the WLAN MAC address of the UE to the WLAN control node based on the identity of the WLAN control node, sending, by the RAN control node, an instruction to the UE to send a signal to the WLAN control node and sending, by the UE, a signal to the WLAN control node based on the identity of the WLAN control node in response to the received instruction. The method further comprises performing, by the WLAN control node, uplink, UL, signal quality measurements on the signal received from the UE, determining control information, by the RAN control node, regarding whether or not to grant access for the UE to the WLAN, the control information being based on the performed DL signal quality measurements, sending, by the RAN control node, the control information to the WLAN control node, and selectively granting access to the WLAN for the UE, by the WLAN control node, based on the received control information and the performed UL signal quality measurements.

According to a second aspect, a method is provided performed by a UE operative for connection to a wireless communication system comprising a WLAN, and a RAN, for efficient usage of resources in the WLAN and the RAN, the WLAN comprising a WLAN control node and the RAN comprising a RAN control node. The method comprises sending to the RAN control node, signal quality measurements performed by the UE on a downlink, DL, signal received from the WLAN control node and sending, to the RAN control node, an identity of the WLAN control node. The method further comprises receiving, from the RAN control node, an instruction to send a signal to the WLAN control node, and sending, to the WLAN control node, a signal based on the identity of the WLAN control node.

According to a third aspect, a method is provided performed by a RAN control node in a wireless communication system comprising a WLAN and a RAN comprising the RAN control node, for efficient usage of resources in the WLAN and the RAN, the WLAN comprising a WLAN control node. The method comprises receiving a WLAN MAC-address of a user equipment, UE, connected to the RAN, receiving, from the UE, DL signal quality measurements performed on a signal received from the WLAN control node and receiving, from the UE, an identity of the WLAN control node. The method further comprises sending, to the WLAN control node, the WLAN MAC address of the UE based on the identity of the WLAN control node, sending, to the UE, an instruction to send a signal to the WLAN control node, determining control information regarding whether or not to grant access for the UE to the WLAN, the control information being based on the received DL signal quality measurement, and sending the determined control information to the WLAN control node.

According to a fourth aspect, a method is provided performed by a WLAN control node in a wireless communication system comprising a WLAN having the WLAN control node and a RAN, for efficient usage of resources in the WLAN and the RAN, the RAN comprising a RAN control node. The method comprises receiving, from the RAN control node, a WLAN MAC address of a UE connected to the RAN which UE also has received a signal transmitted by the WLAN control node, receiving a signal from the UE and performing uplink, UL, signal quality measurements on the signal received from the UE. The method further comprises receiving, from the RAN control node, control information regarding whether or not to grant access for the UE to the WLAN, the control information being based on DL signal quality measurements performed by the UE on the signal transmitted by the WLAN control node and selectively granting access to the WLAN for the UE, based on the received control information and the performed UL signal quality measurements.

According to other aspects, UEs, RAN control nodes, WLAN control nodes, computer programs and computer program products are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a method is provided in which it can be decided to reject or grant WLAN access for a UE currently connected to a RAN at an early stage of a WLAN connection procedure, based on both DL and UL measurements for the UE in the WLAN. This is achieved by the UE providing its WLAN Media Access Control, MAC, address to a RAN control node, for example when sending the WLAN DL measurements to the RAN control node. The UE will also provide the identity of the WLAN control node from which the signals were received on which the DL measurements were performed. The RAN control node will then inform the WLAN control node of the WLAN MAC address of the soon arriving UE. When the UE then tries to access the WLAN control node, the WLAN control node can perform WLAN UL measurements. Based the UL measurements and on control information received from the RAN control node regarding whether or not to grant access, the control information being based at least on the WLAN DL measurements, the WLAN control node can decide in an early stage whether to grant or reject access to the UE based on both DL and UL measurements. This is possible as the UE WLAN MAC address is already known for the WLAN control node when the UE tries to access the WLAN control node.

Figure 1:
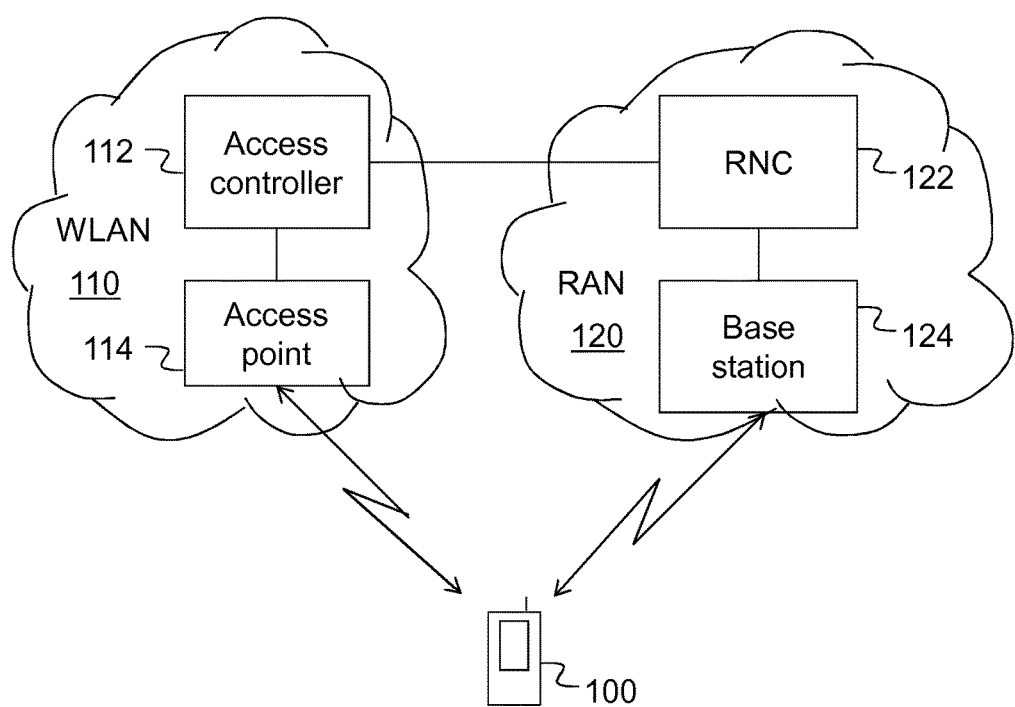
FIG. 1 is a schematic block diagram of an example of a wireless communication system in which the present invention may be used.

FIG. 1 shows an exemplary communication system in which the present invention may be used. The communication system comprises a WLAN 110 and a RAN 120. Also a UE 100 is shown, which can communicate with both the WLAN and the RAN. The RAN 120 comprises a base station 124 that is arranged to transmit and receive signals wirelessly to/from the UE. The RAN further comprises a RAN controller, such as a radio network controller, RNC, 122 for communicating with the base station 124 and also with an access controller 112 in the WLAN. In the following, a RAN control node is mentioned; The RAN control node may be a combination of the RNC 122 and the base station 124 in this exemplary communication system. The WLAN 110 comprises an Access point, AP, 114 that is arranged to transmit and receive signals wirelessly to/from the UE. The WLAN further comprises the access controller 112 for communicating with the AP 114 and also with the RNC 122 in the RAN 120. In the following, a WLAN control node is mentioned; The WLAN control node may be a combination of the access controller 112 and the base access point 114 in this exemplary communication system.

Figure 2:
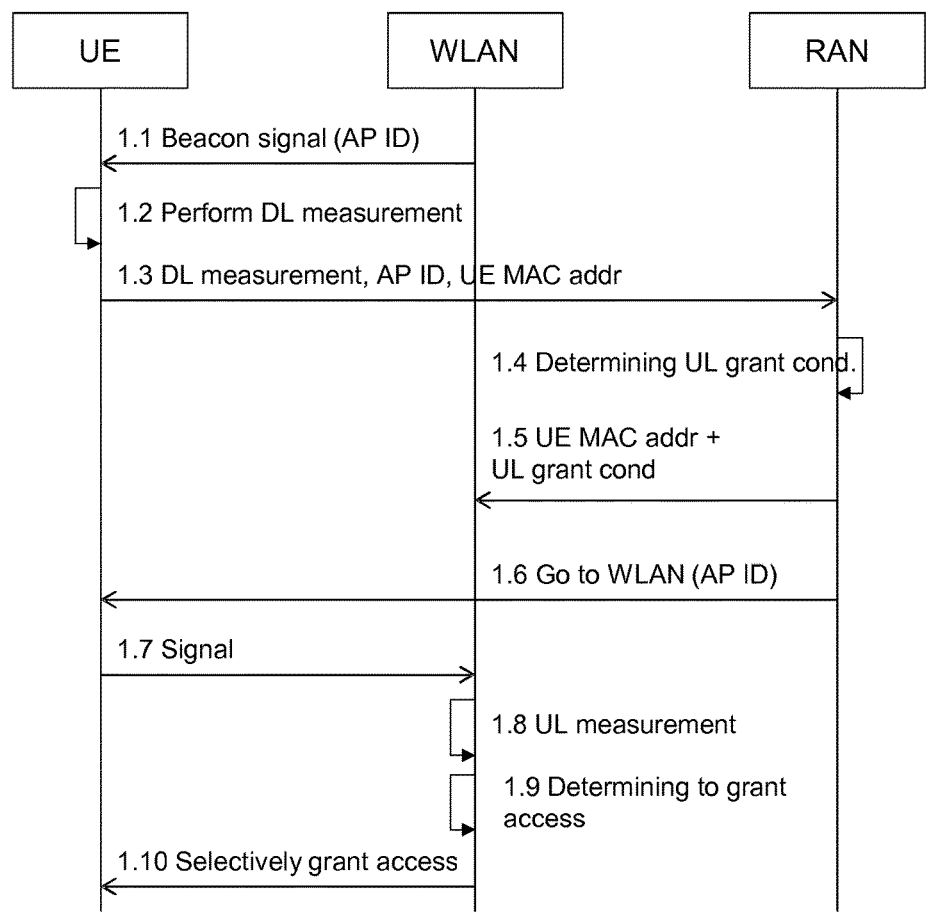
FIG. 2 is a signaling diagram illustrating an example of a procedure according to possible embodiments.

FIG. 2 is a signaling scheme according to an embodiment. The signaling scheme shows exemplary signals sent between a UE, a WLAN and a RAN for achieving efficient usage of communication resources in the WLAN and the RAN. A WLAN control node, i.e. a WLAN AP broadcasts 1.1 a beacon signal (or sends any other signal, such as a response signal to a received probe signal from the UE, so called active scan) comprising an identification, ID, of the AP, which may be the WLAN MAC address of the AP or a basic service set identification, BSS ID. The UE performs 1.2 DL signal quality measurements such as received channel power on the received beacon signal and transmits 1.3 the DL measurements, e.g. as a Received Channel Power Indicator, RCPI, the AP ID and its own MAC address to a RAN control node in the RAN. The UE MAC address may also be received by the RAN control node in any other way, such as in an earlier signal, e.g. a UE capability exchange signal. Alternatively, the UE MAC address may be associated to the IMSI and the association may be stored somewhere in the mobile network.

The RAN control node then determines 1.4 UL measurement conditions that should be fulfilled for the WLAN to grant access to the UE. The UL measurement conditions are determined based on the DL measurement conditions. The UL measurement conditions may state that the received channel power in UL has to be above a certain level for granting WLAN access. The RAN control node then sends 1.5 the determined UL measurement conditions for grant to the WLAN control node together with the WLAN MAC address of the UE. If necessary the RAN control node also sends an instruction to the WLAN control node to perform UL measurements when receiving a signal from the UE that has the sent WLAN MAC address. Thereafter, the RAN control node sends 1.6 an instruction to the UE to send a signal, e.g. a probe signal, to the WLAN control node possibly together with the WLAN AP ID. The latter may be necessary if the UE has sent more than one message 1.3 for more than one WLAN control node or if the message sent by the UE contained information for more than one WLAN control node. As a result, the UE sends 1.7 a signal to the WLAN control node. The WLAN control node performs 1.8 UL measurements on the received signal, and based on the UL measurements and the received UL measurement conditions for grant determines 1.9 whether or not the UE should be granted access. More specifically, the WLAN control node may compare the UL signal quality measurements to the conditions for granting and if the UL signal quality measurements fulfill the conditions, the UE is granted 1.10 access to the WLAN. In most cases the UL measurement level is similar to the DL measurement level and access is granted, but it is important to find exceptions, i.e. when the UL measurements differ a lot from the DL measurements (in a negative way) and in those cases not granting access. When it is decided not to grant access, the WLAN may inform the UE of the rejection but the WLAN may also just not respond to the signal received 1.7 from the UE. In an embodiment, the WLAN may inform the RAN control node or other control nodes of the mobile network of the determined rejection or grant.

Figure 3:
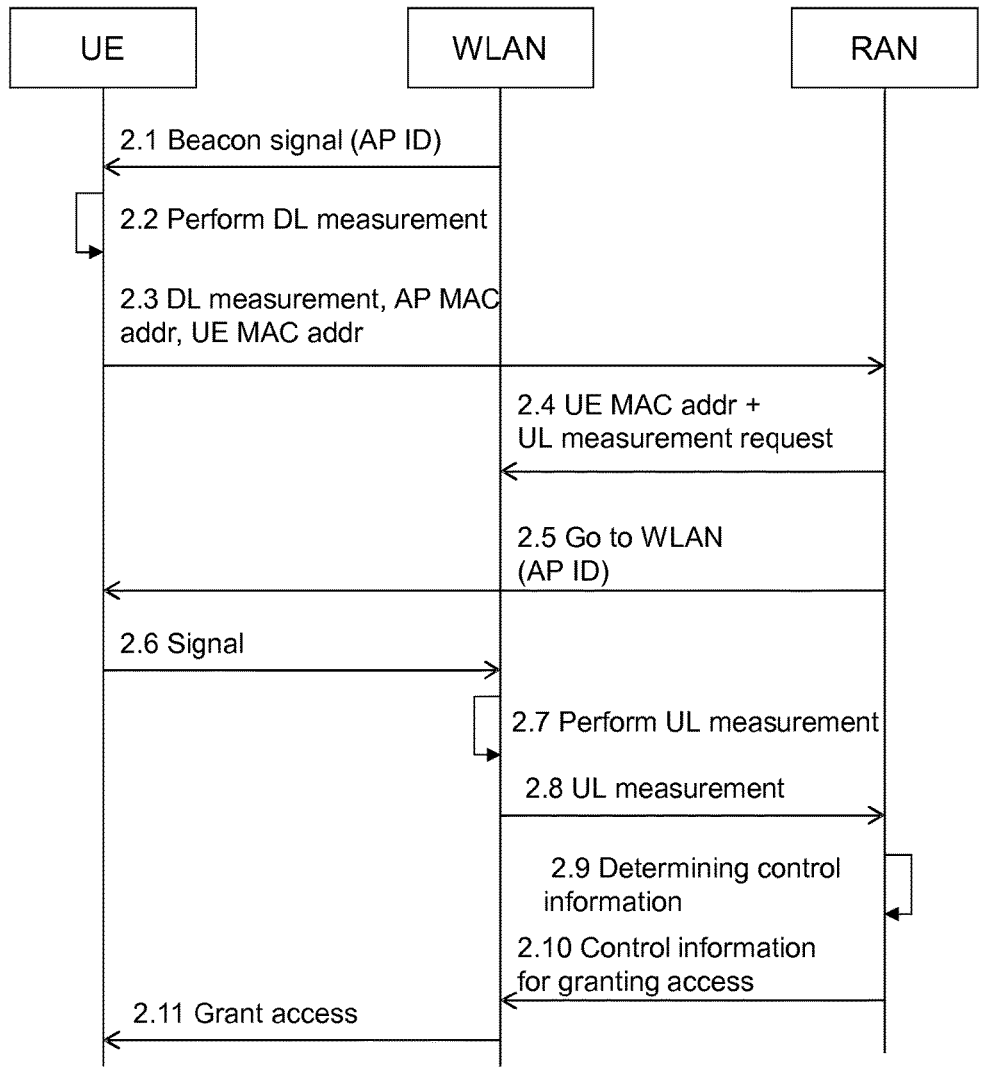
FIG. 3 is a signaling diagram illustrating another example of a procedure according to possible embodiments.

FIG. 3 is a signaling scheme according to another embodiment. The steps 2.1-2.3 are the same as the steps 1.1-1.3 of the embodiment described in FIG. 2. The RAN control node then sends 2.4 the WLAN MAC address of the UE together with an instruction to the WLAN control node to perform UL measurements when receiving a signal from the UE that has the sent WLAN MAC address. Thereafter, the RAN control node sends 2.5 an instruction to the UE to send a signal, e.g. a probe signal, to the WLAN control node, possibly together with the WLAN AP ID. The latter may be necessary if the UE has sent more than one message 2.3 for more than one WLAN control node. As a result, the UE sends 2.6 a signal, e.g. a probe signal to the WLAN control node with the WLAN AP ID. The WLAN control node then performs 2.7 UL measurements on the received signal, as instructed. Thereafter, the WLAN control node sends 2.8 the performed UL measurements to the RAN control node. The RAN control node then determines 2.9, based on the received UL measurements and the received DL measurement, control information whether or not the UE should be granted access to the WLAN. The control information is sent 2.10 to the WLAN control node and the WLAN control node grants 2.11 or rejects WLAN access to the UE accordingly. In most cases the UL measurement level is similar to the DL measurement level and access is granted, but it is important to find exceptions, i.e. when the UL measurements differ a lot from the DL measurements (in a negative way) and in those cases not granting access. When it is decided not to grant access, the WLAN may inform the UE of the rejection but the WLAN may also just not respond to the signal received 2.6 from the UE. In an embodiment, the WLAN may inform the RAN control node or other control nodes of the mobile network of the determined rejection or grant.

Figure 4:
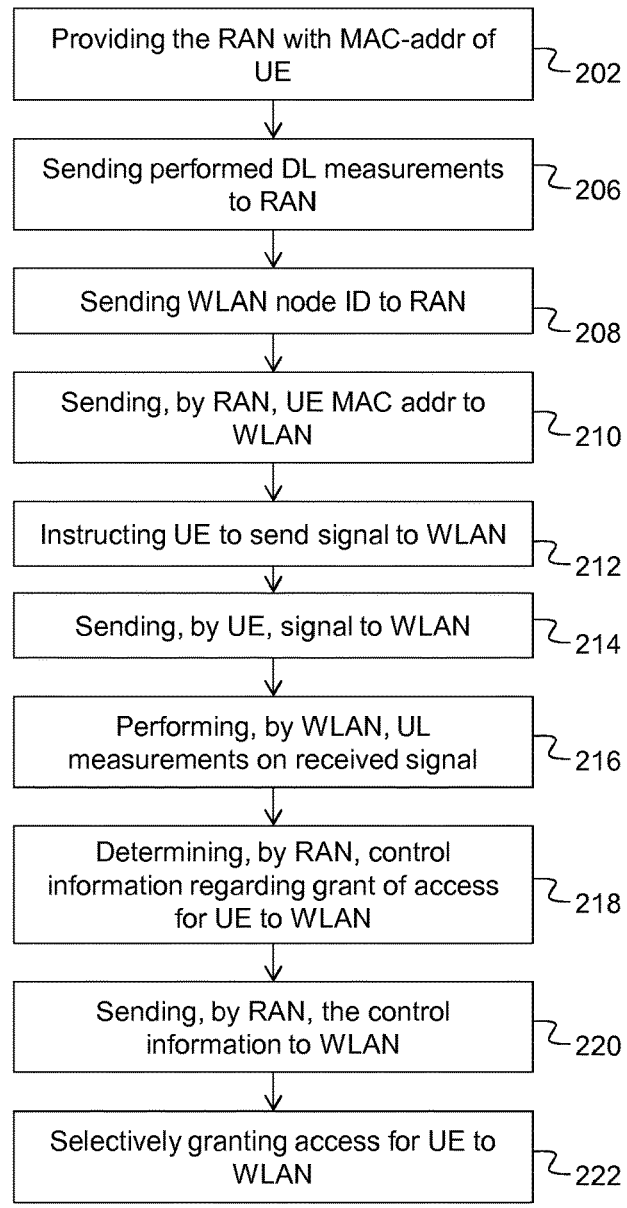
FIGS. 4-7 are flow charts illustrating procedures in different nodes according to different possible embodiments.

According to an embodiment shown in FIG. 4 (and FIG. 1), a method is provided performed by a wireless communication system comprising a WLAN 110 and a RAN for efficient usage of communication resources in the WLAN and the RAN, wherein the WLAN comprises a WLAN control node 112, 114 and the RAN comprises a RAN control node 122, 124. The method comprises providing 202 the RAN control node with a WLAN MAC-address of a user equipment, UE, connected to the RAN. The method further comprises sending 206, by the UE to the RAN control node, signal quality measurements performed by the UE on a DL signal received from the WLAN control node and sending 208, by the UE, an identity of the WLAN control node to the RAN control node. The method further comprises sending 210, by the RAN control node, the WLAN MAC address of the UE to the WLAN control node based on the identity of the WLAN control node, sending 212 by the RAN control node, an instruction to the UE to send a signal to the WLAN control node and sending 214, by the UE, a signal to the WLAN control node based on the identity of the WLAN control node in response to the received instruction. The method further comprises performing 216, by the WLAN control node UL signal quality measurements on the signal received from the UE, and determining 218 control information, by the RAN control node, regarding whether or not to grant access for the UE to the WLAN, the control information being based on the performed DL signal quality measurements. The method further comprises sending 220, by the RAN control node, the control information to the WLAN control node, and selectively granting 222 access to the WLAN for the UE, by the WLAN control node, based on the received control information and the performed UL signal quality measurements.

A WLAN is a network in which a radio communication technology for generally short-range communication is used. The WLAN radio communication technology is typically based on the IEEE 802.11 standard. However, other similar standards may apply. The WLAN may also be called a Wi-Fi network. A RAN is a network in which a radio communication technology for generally long-range communication is used, a so called mobile or cellular communications technology. The RAN radio communication technology is typically based on 3GPP or ETSI standards. Examples of RANs are Global System for Mobile Communications, GSM, radio networks and other second generation networks, third generation of mobile communications technology, 3G, radio networks such as Universal Mobile Telecommunication System, UMTS, Code Division Multiple Access 2000, CDMA 2000, Wideband CDMA, W-CDMA, Time Division Synchronous CDMA, TD-SCDMA, High Speed Packet Access, HSPA, and fourth generation networks, 4G, such as the Long Term Evolution, LTE, standard of 3GPP.

The different actions described above in connection with FIG. 4 may be performed in a different order than described above. In other words, the action order described above and in the claims is one example of an action order, other orders of the actions are possible within the scope of the claims.

A WLAN control node may be any node in the WLAN capable of performing the stated steps. For example, the WLAN control node may be a WLAN Access point, AP, a WLAN Access Controller, AC, a Broadband Network Gateway, or a combination of two or three of these nodes. A RAN control node may be any node in the RAN, or even in the core network to which the RAN is connected, capable of performing the stated steps. For example, the RAN control node may be a base station, such as a base transceiver station, BTS, a Node B, or an eNodeB, a base station controller, BSC, a radio network controller, RNC, a mobility management entity, MME or a combination of any of these nodes.

The WLAN MAC-address of the UE is the MAC-address that the UE uses to identify itself in the WLAN. The WLAN MAC-address of the UE may be communicated by the UE to the RAN control node, for example when sending the DL measurements to the RAN control node or as part of UE capabilities sent from the UE to the RAN control node. The signal on which the UE has performed DL measurements may be a beacon signal broadcasted by the WLAN control node. The UE may have received the WLAN control node identity together with the signal on which it has performed DL measurements, e.g. a beacon signal. The UE may send the WLAN control node identity to the RAN control node when sending the DL measurements to the RAN control node. The instruction sent by the RAN control node to the UE may include the identity of the WLAN control node in case the UE has sent more than one DL measurements for more than one WLAN so that the UE knows which WLAN control node the RAN wants it to send a signal to. The signal that the UE is instructed to send may be a Probe signal. The step of the WLAN control node performing UL signal quality measurements on the signal received from the UE may be performed determined by the WLAN MAC address of the UE. In other words, if the WLAN MAC address is a MAC address for which the WLAN control node should perform UL signal quality measurements, the WLAN control node performs the UL measurements. The WLAN control node identity may be a MAC-address of the WLAN control node.

The control information sent by the RAN control node to the WLAN control node may be information for controlling whether the WLAN should grant WLAN access to the UE or not. The control information is based at least on the DL measurements. The step of selectively granting means granting or not granting access to the UE depending on the UL measurements and the control information, which is based on at least the DL measurements. This step may function as an emergency exit, i.e. normally the UL measurements are good enough and the WLAN control node will grant access. In more exceptional cases it may happen that the UL measurement are much worse than the DL measurements and in these cases the WLAN control node should reject access to the WLAN for the UE. The WLAN control node may reject access by simply not sending any response signal to the UE.

By such a method as described in connection with FIG. 4 it is possible to decide whether to grant or not grant access to a WLAN for the UE based on both UL and DL measurements on signals between the WLAN control node and the UE in the WLAN. Further, it is possible to decide in a comparatively early stage of a connection procedure whether an access to the WLAN should be granted for the UE or not. This method may in addition also take UL and/or DL measurements for the UE performed in the RAN into consideration when deciding whether to grant access to the WLAN for the UE.

According to an embodiment, the method may also comprise a step of the RAN control node instructing the WLAN control node to perform UL measurements on a signal received from the UE having the WLAN MAC address that the RAN sent to the WLAN. This step may be performed after or together with the step of sending the WLAN MAC address of the UE to the WLAN.

According to another embodiment, the control information determined 218 based on the received DL measurements is UL measurement conditions for which the WLAN control node should grant the UE access to the WLAN when the condition is fulfilled. In other words, the control information is UL measurement conditions that are determined based on the DL measurements. The UL measurement conditions are conditions that should be fulfilled for granting the UE access to the WLAN, e.g. an UL measurement threshold value that the performed UL measurements should have for the WLAN control node to grant access to WLAN.

According to another embodiment, the method further comprises sending, by the WLAN control node, the performed UL signal quality measurements to the RAN control node, and then the determining of control information 218, by the RAN control node whether to grant access for the UE to the WLAN, is based on both the UL signal quality measurements and the DL signal quality measurements. Since the control information is based on both the UL and DL measurements, the control information may function as an advice to the WLAN node to grant or not grant access to the UE based on the UL and DL measurements. The WLAN control node then grants or rejects access to the UE depending on the received control information and the UL measurements, which in this case have been considered already in the control information.

Figure 5:
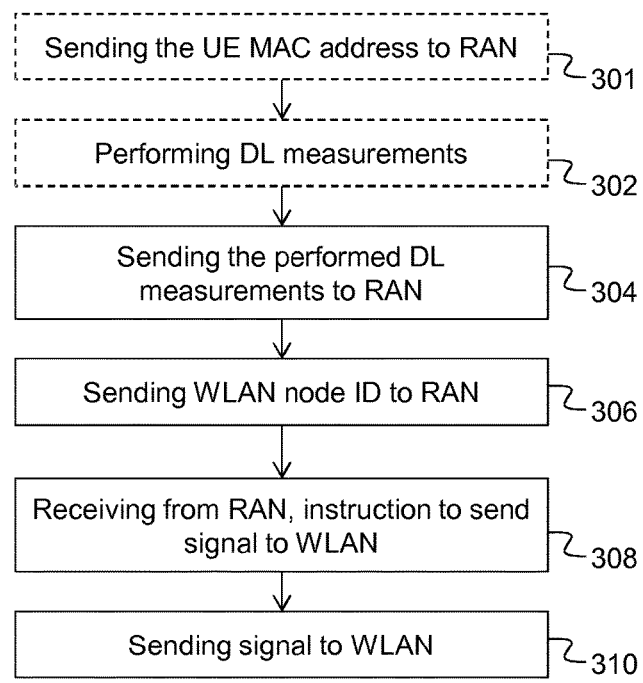

FIG. 5 shows a flow chart of a method according to an embodiment performed by a user equipment operative for connection to a wireless communication system comprising a WLAN and a RAN for efficient usage of resources in the WLAN and the RAN, wherein the WLAN comprises a WLAN control node and the RAN comprises a RAN control node. The method comprises sending 304 to the RAN control node, signal quality measurements performed by the UE on a DL signal received from the WLAN control node and sending 306, to the RAN control node, an identity of the WLAN control node. The method further comprises receiving 308, from the RAN control node, an instruction to send a signal to the WLAN control node, and sending 310, to the WLAN control node, a signal based on the identity of the WLAN control node. The signal sent 310 to the WLAN control node may be a probe request signal. Alternatively, the signal may be a separate signal sent only for the purpose of the WLAN node performing UL measurements on the signal.

According to an embodiment, the method may further comprise sending 301, to the RAN control node, the WLAN MAC address of the UE.

According to another embodiment, the method may further comprise performing 302 signal quality measurements on a downlink, DL, signal received from the WLAN control node.

Figure 6:
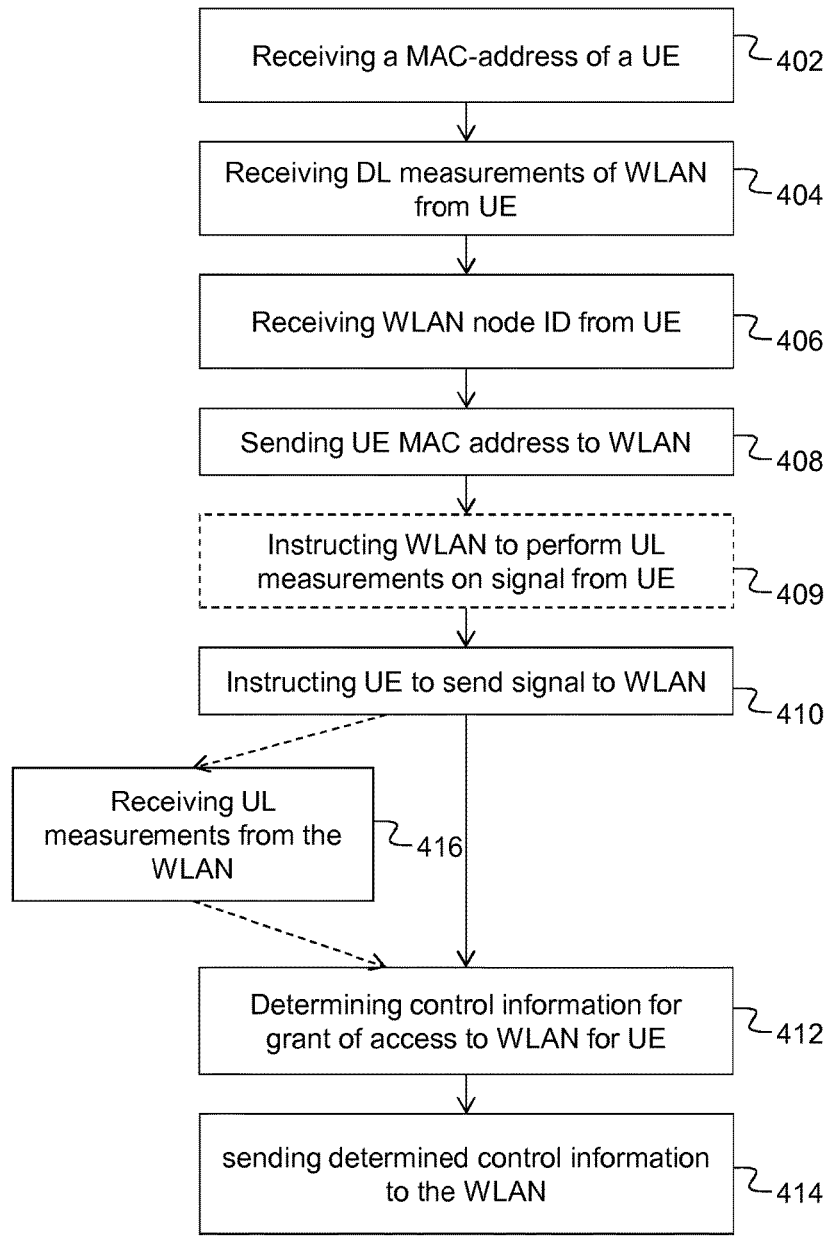

FIG. 6 shows a flow chart of a method according to an embodiment performed by a RAN control node in a wireless communication system comprising a WLAN and a RAN comprising the RAN control node, for efficient usage of resources in the WLAN and the RAN, wherein the WLAN comprises a WLAN control node. The method comprises receiving 402 a WLAN MAC-address of a UE connected to the RAN, receiving 404 from the UE, DL signal quality measurements performed on a signal received from the WLAN control node, and receiving 406 from the UE, an identity of the WLAN control node. The method further comprises sending 408 to the WLAN control node, the WLAN MAC address of the UE based on the identity of the WLAN control node and sending 410 to the UE, an instruction to send a signal to the WLAN control node. The method further comprises determining 412 control information regarding whether or not to grant access for the UE to the WLAN, the control information being based on the received DL signal quality measurement, and sending 414 the determined control information to the WLAN control node.

According to an embodiment, the control information determined 412 based on the received DL measurement may be a UL measurement condition for which the WLAN control node should grant the UE access to the WLAN when the condition is fulfilled.

According to another embodiment the method may further comprise receiving 416, from the WLAN control node, UL signal quality measurements performed by the WLAN control node relating to signals received from the UE. Further, the determining 412 of control information may be based on both the UL signal quality measurements and the DL signal quality measurements.

According to an embodiment, the method may further comprise sending 409 an instruction to the WLAN control node to perform measurements on a signal received from the UE. The instruction may be sent 409 in the same message as the WLAN MAC address of the UE is sent or in a separate message.

Figure 7:
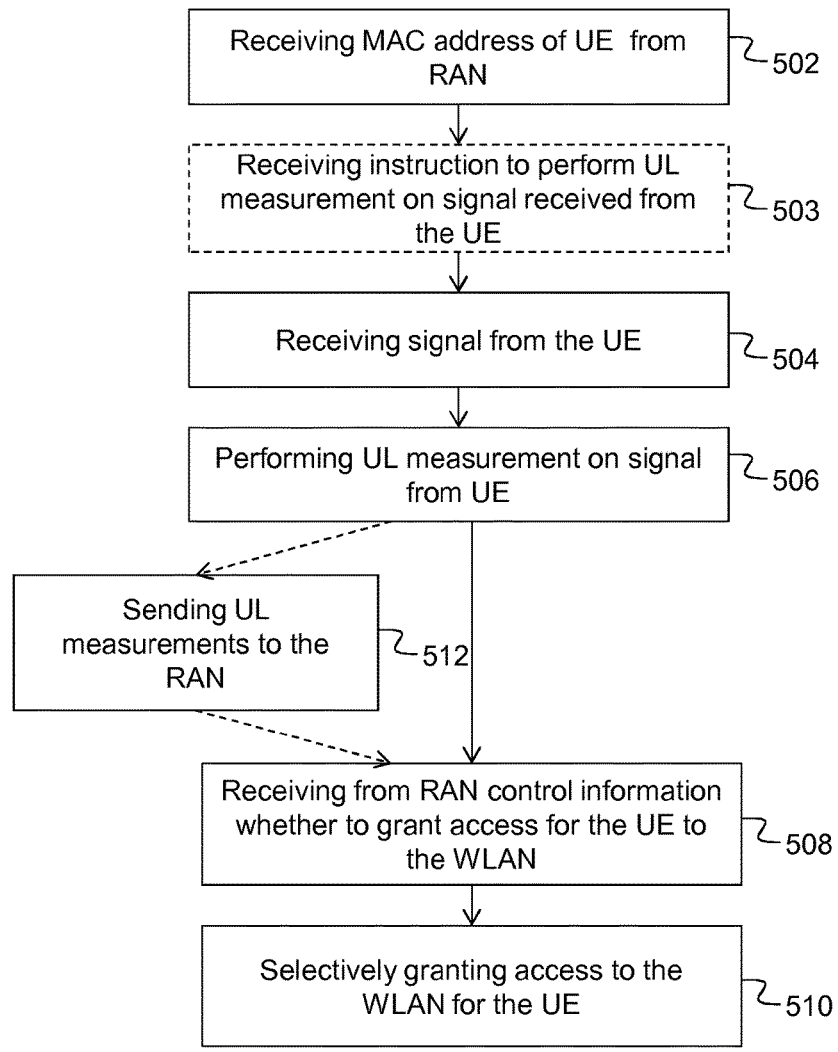

FIG. 7 shows a flow chart of a method according to an embodiment performed by a WLAN control node in a wireless communication system comprising a WLAN having the WAN control node and a RAN, for efficient usage of resources in the WLAN and the RAN, wherein the RAN comprises a RAN control node. The method comprises receiving 502 from the RAN control node, a WLAN MAC address of a UE connected to the RAN, which UE also has received a signal transmitted by the WLAN control node, receiving 504 a signal from the UE and performing 506 UL signal quality measurements on the signal received from the UE. The method further comprises receiving 508 from the RAN control node, control information regarding whether or not to grant access for the UE to the WLAN, the control information being based on DL signal quality measurements performed by the UE on the signal transmitted by the WLAN control node and selectively granting 510 access to the WLAN for the UE, based on the received control information and the performed UL signal quality measurements.

According to an embodiment, the received 508 control information is a UL measurement condition for which the WLAN control node should grant the UE access to the WLAN when the condition is fulfilled.

According to another embodiment, the method further comprises sending 512 to the RAN control node, the performed UL signal quality measurements. Further, the received 508 control information is based on both the UL signal quality measurements and the DL signal quality measurement.

According to another embodiment, the method further comprises receiving 503 an instruction from the RAN control node to perform measurements on the signal received from the UE.

Figure 8:
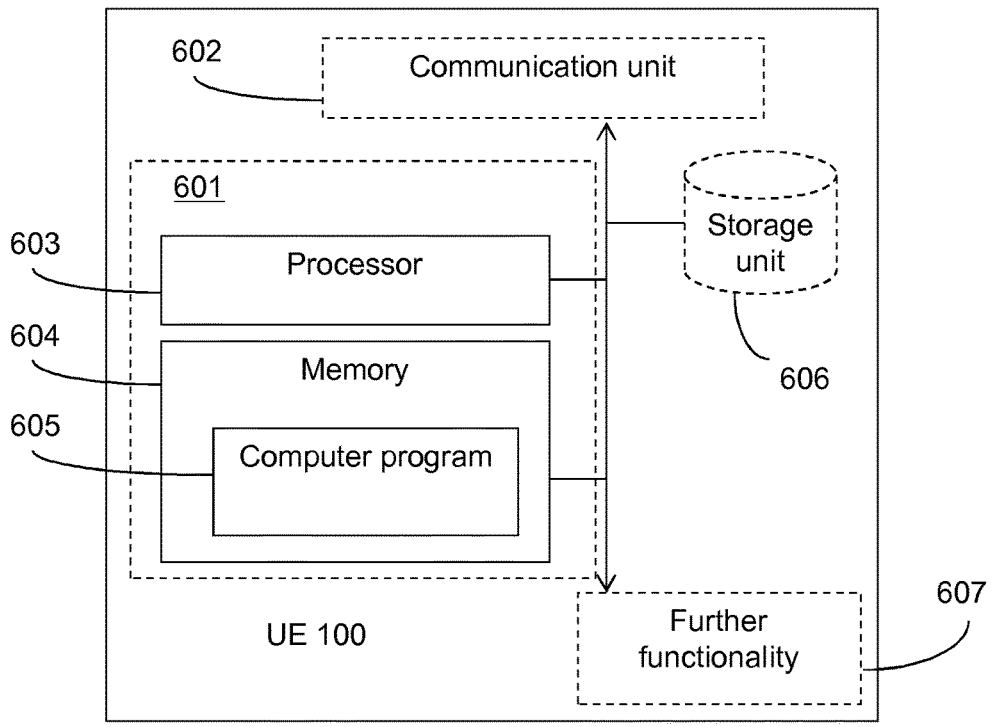
FIGS. 8-13 are schematic block diagrams illustrating different nodes according to different possible embodiments.

FIG. 8 shows a schematic block diagram of a UE 100 connectable to a wireless communication system comprising a WLAN having a WLAN control node and a RAN having a RAN control node. The UE 100 comprises a processor 603 and a memory 604. The memory contains instructions executable by said processor whereby the UE is operative for sending to the RAN control node, signal quality measurements performed by the UE on a downlink, DL, signal received from the WLAN control node and sending, to the RAN control node, an identity of the WLAN control node.

The memory 604 further contains instructions executable by said processor whereby the UE is further operative for receiving, from the RAN control node, an instruction to send a signal to the WLAN control node, and sending, to the WLAN control node, a signal based on the identity of the WLAN control node.

The UE 100 may further comprise a communication unit 602, which may be considered to comprise conventional means for communicating from and/or to the other nodes in the network, such as the RAN control node 122 and the WLAN control node 112. The conventional communication means may include at least one transmitter and at least one receiver. The UE may further comprise one or more storage units 606 and further functionality 607 useful for the UE 110 to serve its purpose as UE, such as a battery, an encoder/decoder unit etc. The instructions executable by said processor may be arranged as a computer program 605 stored in said memory 604. The processor 603 and the memory 604 may be arranged in an arrangement 601. The arrangement 601 may alternatively be a micro processor and adequate software and storage therefore, a Programmable Logic Device, PLD, or other electronic component(s)/processing circuit(s) configured to perform the actions, or methods mentioned above.

The computer program 605 may comprise computer readable code means, which when run in the UE 100 causes the UE 100 to perform the steps described in the method described in relation to FIG. 5. The computer program may be carried by a computer program product connectable to the processor. The computer program product may be the memory 604. The memory 604 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 604. Alternatively, the computer program may be stored on a server or any other entity connected to the communication network to which the UE has access via its communication unit 602. The computer program may then be downloaded from the server into the memory 604.

According to an embodiment, the memory 604 further contains instructions executable by said processor whereby the UE is operative for sending, to the RAN control node, the WLAN MAC address of the UE.

According to another embodiment, the memory 604 further contains instructions executable by said processor whereby the UE is operative for performing signal quality measurements on a downlink, DL, signal received from the WLAN control node.

Figure 9:
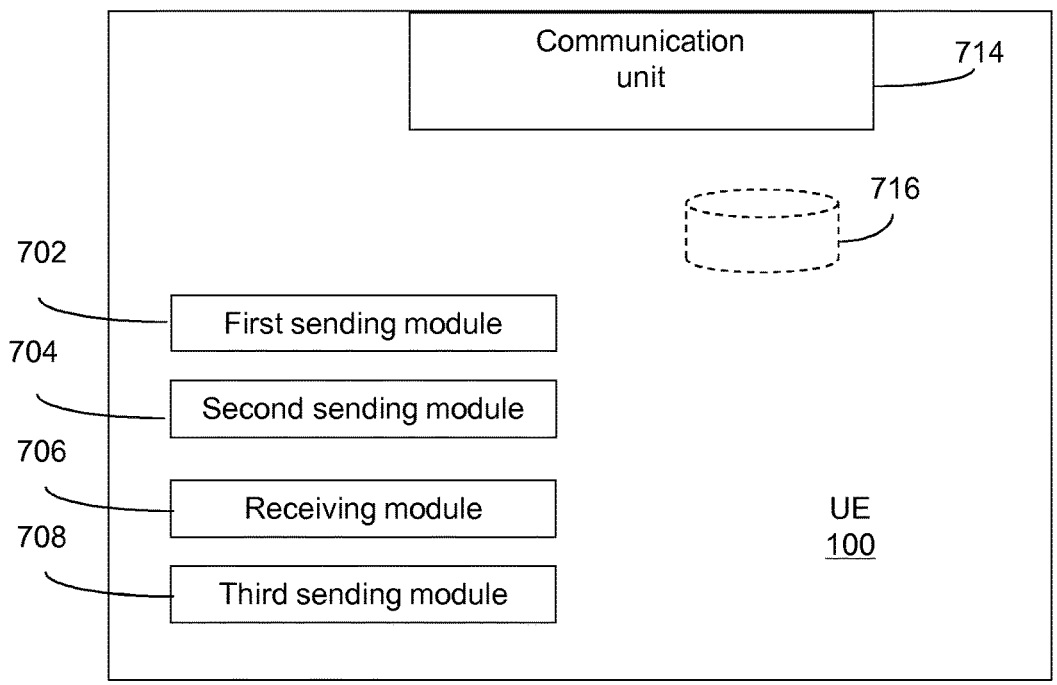

According to an embodiment shown in FIG. 9, a UE 100 is provided connectable to a wireless communication system comprising a WLAN comprising a WLAN control node 112, 114 and a RAN comprising a RAN control node 122, 124. The UE 100 comprises a first sending module 702 for sending to the RAN control node, signal quality measurements performed by the UE on a downlink, DL, signal received from the WLAN control node and a second sending module 704 for sending to the RAN control node, an identity of the WLAN control node. The UE 100 further comprises a receiving module 706 for receiving from the RAN control node, an instruction to send a signal to the WLAN control node, and a third sending module 708 for sending to the WLAN control node, a signal based on the identity of the WLAN control node.

Figure 10:
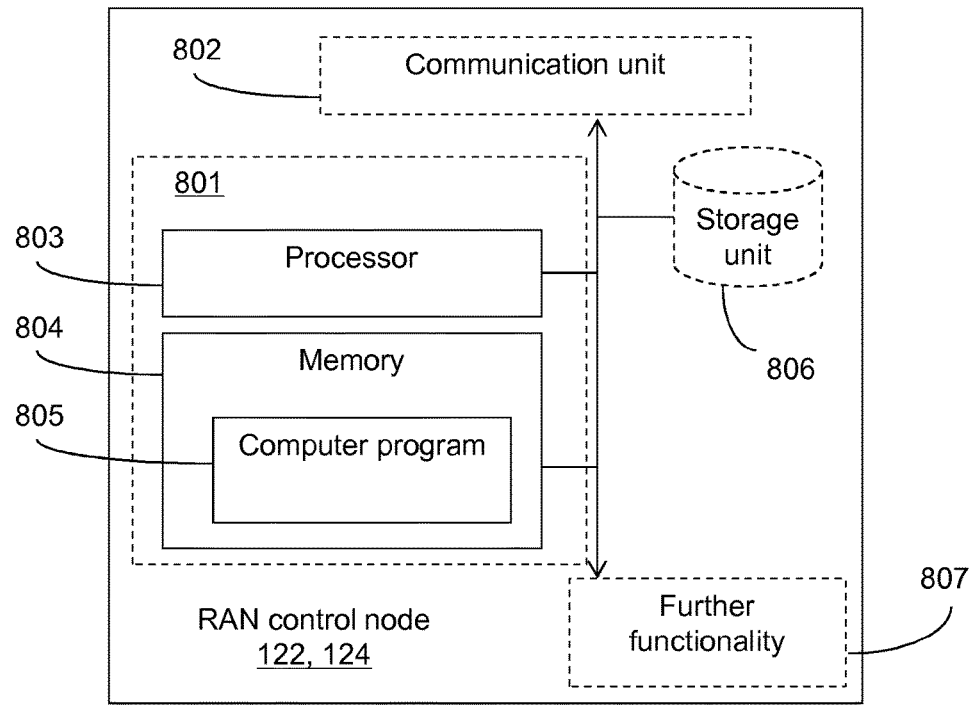

FIG. 10 shows a schematic block diagram of a RAN control node 122, 124 in a wireless communication system comprising a WLAN having a WLAN control node and a RAN having the RAN control node. The RAN control node 122, 124 comprises a processor 803 and a memory 804. The memory contains instructions executable by said processor whereby the RAN control node is operative for receiving a WLAN MAC-address of a UE, connected to the RAN, receiving, from the UE, DL signal quality measurements performed on a signal received from the WLAN and receiving, from the UE, an identity of the WLAN control node. The memory further contains instructions executable by said processor whereby the RAN control node is operative for sending, to the WLAN control node, the WLAN MAC address of the UE based on the identity of the WLAN control node and sending, to the UE, an instruction to send a signal to the WLAN control nod. The memory 804 further contains instructions executable by said processor whereby the RAN control node is operative for determining control information regarding whether or not to grant access for the UE to the WLAN, the control information being based on the received DL signal quality measurement; and sending the determined control information to the WLAN control node.

The RAN control node 122, 124 may further comprise a communication unit 802, which may be considered to comprise conventional means for communicating from and/or to the other nodes in the network, such as the WLAN control node 112, 114 or a UE connected to the network. The conventional communication means may include at least one transmitter and at least one receiver. The RAN control node may further comprise one or more storage units 806 and further functionality 807 useful for the RAN control node 122, 124 to serve its purpose as a RAN control node, such as an encoder/decoder unit, a scheduling unit etc. The instructions executable by said processor may be arranged as a computer program 805 stored in said memory 804. The processor 803 and the memory 804 may be arranged in an arrangement 801. The arrangement 801 may alternatively be a micro processor and adequate software and storage therefore, a PLD or other electronic component(s)/processing circuit(s) configured to perform the actions, or methods mentioned above.

The computer program 805 may comprise computer readable code means, which when run in the RAN control node 122, 124 causes the RAN control node to perform the steps described in the method described in relation to FIG. 6. The computer program may be carried by a computer program product connectable to the processor. The computer program product may be the memory 804. The memory 804 may be realized as for example a RAM, ROM or an EEPROM. Further, the computer program may be carried by a separate computer-readable medium, such as a CD, DVD or flash memory, from which the program could be downloaded into the memory 804. Alternatively, the computer program may be stored on a server or any other entity connected to the communication network to which the RAN control node has access via its communication unit 802. The computer program may then be downloaded from the server into the memory 804.

According to an embodiment, the control information determined based on the received DL measurement may be a UL measurement condition for which the WLAN control node should grant the UE access to the WLAN when the condition is fulfilled.

According to another embodiment, the memory 804 may further contain instructions executable by said processor whereby the RAN control node 122, 124 is operative for receiving, from the WLAN control node, UL signal quality measurements performed by the WLAN control node relating to signals received from the UE. Further, the determining of control information may be based on both the UL signal quality measurements and the DL signal quality measurements.

According to another embodiment, the memory 804 may further contain instructions executable by said processor whereby the RAN control node is operative for sending an instruction to the WLAN control node to perform measurements on a signal received from the UE.

Figure 11:
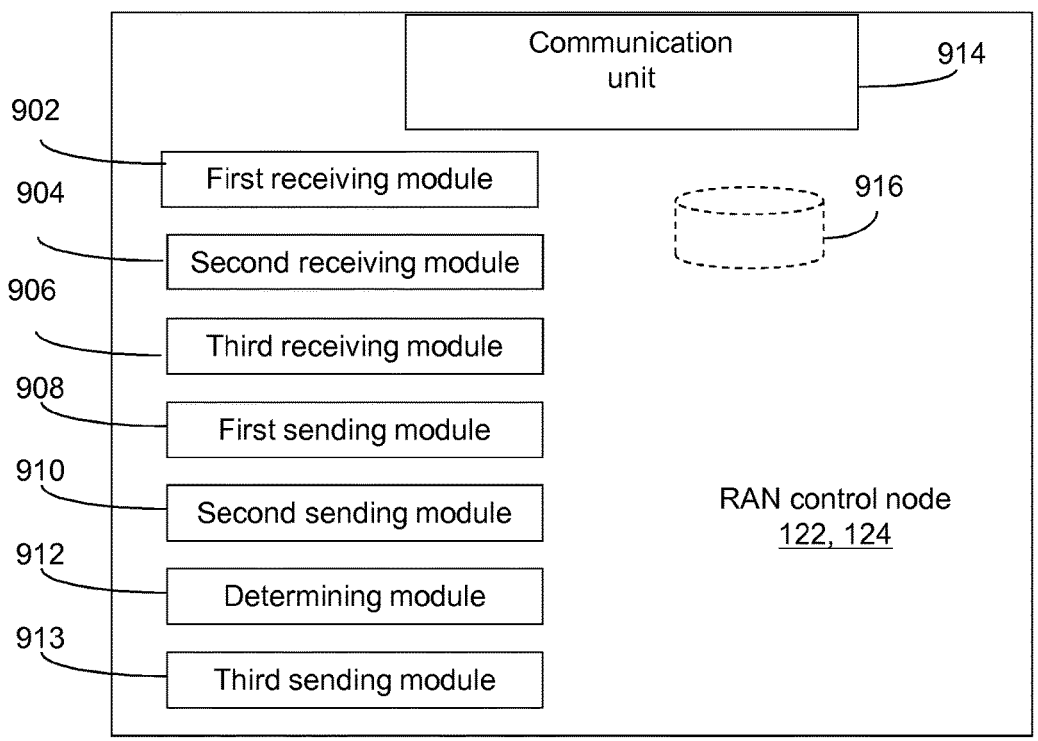

According to an embodiment shown in FIG. 11, a RAN control node 122, 124 is provided in a wireless communication system comprising a WLAN comprising a WLAN control node 112, 114 and a RAN comprising the RAN control nod. The RAN control node 122, 124 comprises a first receiving module 902 for receiving a WLAN MAC-address of a UE connected to the RAN, a second receiving module 904 for receiving, from the UE, DL signal quality measurements performed on a signal received from the WLAN and a third receiving module 906 for receiving, from the UE, an identity of the WLAN control node. The RAN control node 122, 124 further comprises a first sending module 908 for sending, to the WLAN control node, the WLAN MAC address of the UE based on the identity of the WLAN control node and a second sending module 910 for sending, to the UE, an instruction to send a signal to the WLAN control node. The RAN control node 122, 124 further comprises a determining module 912 for determining control information regarding whether or not to grant access for the UE to the WLAN, the control information being based on the received DL signal quality measurement; and a third sending module 913 for sending the determined control information to the WLAN control node.

Figure 12:
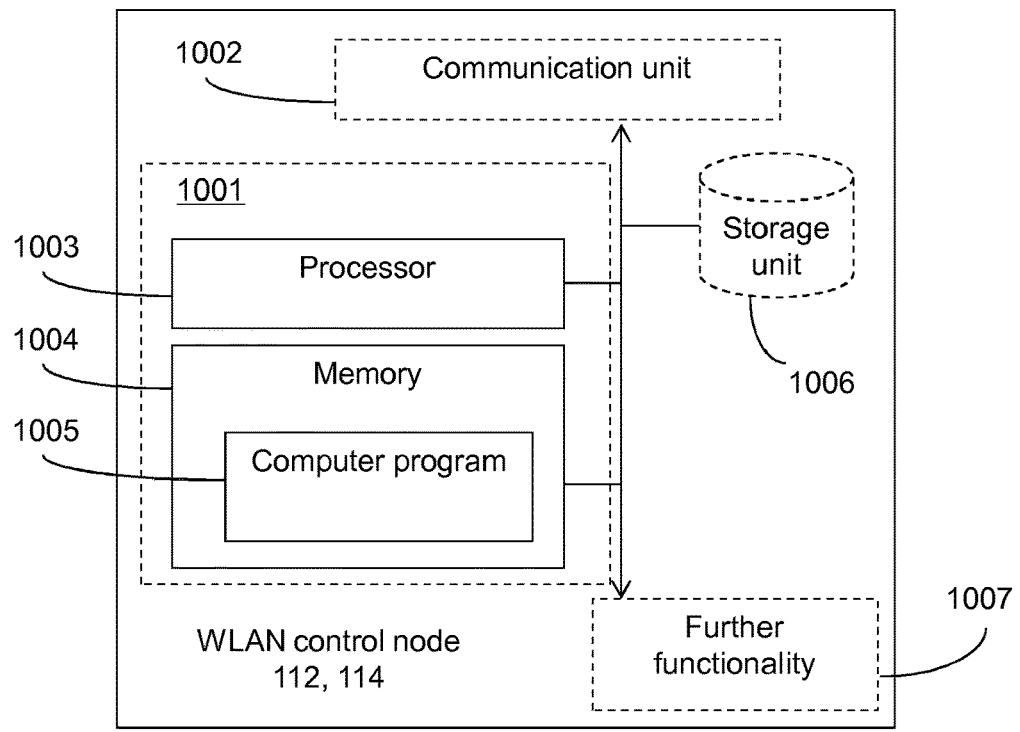

FIG. 12 shows a schematic block diagram of a WLAN control node 112, 114 in a wireless communication system comprising a WLAN comprising the WLAN control node and a RAN comprising a RAN control node 122, 124. The WLAN control node 112, 114 comprises a processor 1003 and a memory 1004. Said memory contains instructions executable by said processor, whereby said WLAN control node 112, 114 is operative for receiving, from the RAN control node, a WLAN MAC address of a UE 100 connected to the RAN which UE also has received a signal transmitted by the WLAN control node, receiving a signal from the UE and performing UL signal quality measurements on the signal received from the UE. Said memory 1004 further contains instructions executable by said processor, whereby said WLAN control node 112, 114 is operative for receiving, from the RAN control node, control information regarding whether or not to grant access for the UE to the WLAN, the control information being based on DL signal quality measurements performed by the UE on the signal transmitted by the WLAN control node and selectively granting access to the WLAN for the UE, based on the received control information and the performed UL signal quality measurements.

The WLAN control node 112, 114 may further comprise a communication unit 1002, which may be considered to comprise conventional means for communicating from and/or to the other nodes in the network, such as the RAN control node 122, 124 or a UE connected to the network. The conventional communication means may include at least one transmitter and at least one receiver. The WLAN control node may further comprise one or more storage units 1006 and further functionality 1007 useful for the WLAN control node 112, 114 to serve its purpose as a WLAN control node, such as an encoder/decoder unit, a possible WLAN scheduling unit etc. The instructions executable by said processor may be arranged as a computer program 1005 stored in said memory 1004. The processor 1003 and the memory 1004 may be arranged in an arrangement 1001. The arrangement 1001 may alternatively be a micro processor and adequate software and storage therefore, a PLD or other electronic component(s)/processing circuit(s) configured to perform the actions, or methods mentioned above.

The computer program 1005 may comprise computer readable code means, which when run in the WLAN control node 112, 114 causes the WLAN control node to perform the steps described in the method described in relation to FIG. 7. The computer program may be carried by a computer program product connectable to the processor. The computer program product may be the memory 1004. The memory 1004 may be realized as for example a RAM, ROM or EEPROM. Further, the computer program may be carried by a separate computer-readable medium, such as a CD, DVD or flash memory, from which the program could be downloaded into the memory 1004. Alternatively, the computer program may be stored on a server or any other entity connected to the communication network to which the WLAN control node has access via its communication unit 1002. The computer program may then be downloaded from the server into the memory 1004.

According to an embodiment, the received control information may be a UL measurement condition for which the WLAN control node should grant the UE access to the WLAN when the condition is fulfilled.

According to an embodiment, said memory 1004 may further contain instructions executable by said processor 1003, whereby said WLAN control node 112, 114 is operative for sending, to the RAN control node 122, 124, the performed UL signal quality measurements, and wherein the received control information is based on both the UL signal quality measurements and the DL signal quality measurement.

According to another embodiment, said memory 1004 may further contains instructions executable by said processor 1003, whereby said WLAN control node 112, 114 is operative for receiving an instruction from the RAN control node 122, 124 to perform measurements on the signal received from the UE.

Figure 13:
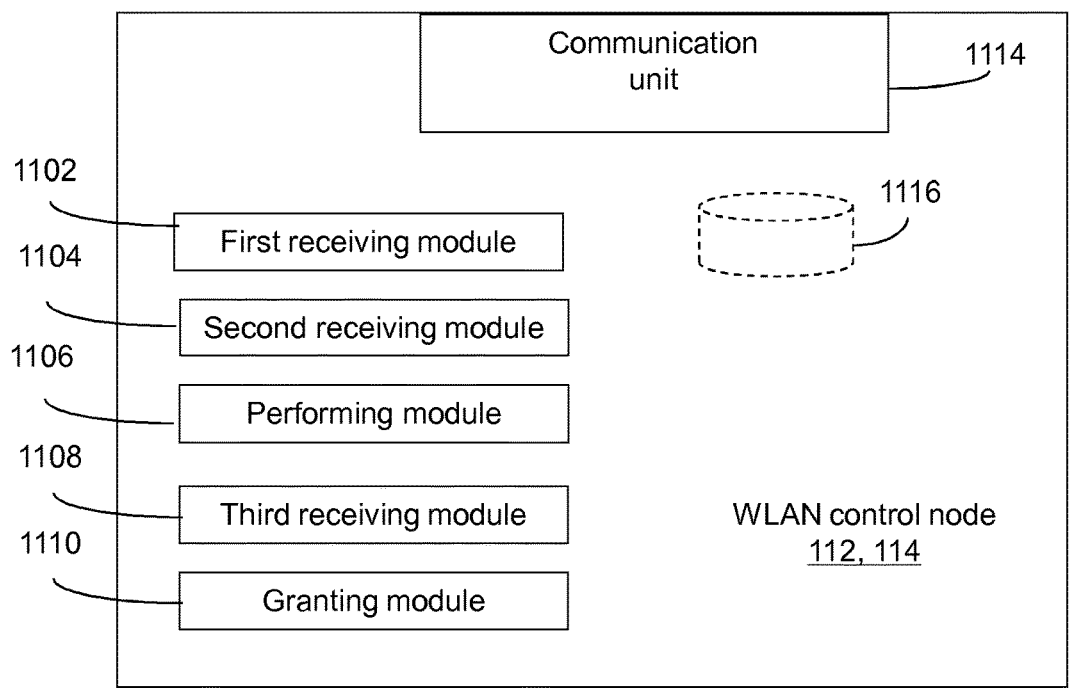

According to an embodiment described in relation to FIG. 13, a WLAN control node 112, 114 is described, in a wireless communication system comprising a WLAN comprising the WLAN control node and a RAN comprising a RAN control node 122, 124. The WLAN control node 112, 114 comprises a first receiving module 1102 for receiving, from the RAN control node, a WLAN MAC address of a UE 100 connected to the RAN which UE also has received a signal transmitted by the WLAN control node, and a second receiving module 1104 for receiving a signal from the UE. The WLAN control node 112, 114 further comprises a performing module 1106 for performing UL signal quality measurements on the signal received from the UE and a third receiving module 1108 for receiving, from the RAN control node, control information regarding whether or not to grant access for the UE to the WLAN, the control information being based on DL signal quality measurements performed by the UE on the signal transmitted by the WLAN control node. The WLAN control node 112, 114 further comprises a granting module 1110 for selectively granting access to the WLAN for the UE, based on the received control information and the performed UL signal quality measurements.

Although the instructions described in the embodiments disclosed above in relation to FIGS. 8, 10 and 12 are implemented as computer programs 605, 805, 1005 to be executed by processors 603, 803, 1003 respectively, at least one of the instructions may in alternative embodiments be implemented at least partly as hardware circuits.

According to an embodiment, the wireless communication system may have an Inter radio access technology, RAT, mobility control function that has at least a control plane interface to the WLAN and the RAN. The Inter-RAT mobility control function can be a separate node that has access to UE context and UE information from both RAN and WLAN or may be a distributed function in the RAN control node and the WLAN control node or may be a combination of distributed function and separate node. The Inter-RAT mobility control function may function as a controlling function, i.e. a function that determines control information regarding whether or not the WLAN should grant access to the UE depending on UL and DL measurements in the WLAN and possibly also on UL and DL measurements in the RAN. In an embodiment, the WLAN control node and/or the RAN control node may inform the Inter-RAT mobility control function of a subsequent rejection or grant of access to the WLAN for the UE.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. A method performed by a wireless communication system comprising a Wireless Local Area Network (WLAN) and a radio access network (RAN) for efficient usage of communication resources in the WLAN and the RAN, the WLAN comprising a WLAN control node and the RAN comprising a RAN control node, the method comprising:
providing the RAN control node with a WLAN MAC-address of a user equipment (UE) connected to the RAN;
sending, by the UE to the RAN control node, signal quality measurements performed by the UE on a downlink (DL) signal received from the WLAN control node;
sending, by the UE, an identity of the WLAN control node to the RAN control node;
sending, by the RAN control node, the WLAN MAC address of the UE to the WLAN control node based on the identity of the WLAN control node;
sending, by the RAN control node, an instruction to the UE to send a signal to the WLAN control node;
sending, by the UE, a signal to the WLAN control node based on the identity of the WLAN control node in response to the received instruction, performing, by the WLAN control node, uplink (UL) signal quality measurements on the signal received from the UE determining control information, by the RAN control node, regarding whether or not to grant access for the UE to the WLAN, the control information being based on the performed DL signal quality measurements;

sending, by the RAN control node, the control information to the WLAN control node; and selectively granting access to the WLAN for the UE, by the WLAN control node, based on the received control information and the performed UL signal quality measurements.

2. The method of claim 1, wherein the control information determined based on the received DL measurements is UL measurement conditions for which the WLAN control node should grant the UE access to the WLAN when the condition is fulfilled.

3. The method of claim 1, further comprising:
sending, by the WLAN control node, the performed UL signal quality measurements to the RAN control node, and
the determining of control information, by the RAN control node, whether to grant access for the UE to the WLAN is based on both the UL signal quality measurements and the DL signal quality measurements.

4. A method performed by a user equipment (UE) operative for connection to a wireless communication system comprising a Wireless Local Area Network (WLAN) and a radio access network (RAN) for efficient usage of resources in the WLAN and the RAN, the WLAN comprising a WLAN control node and the RAN comprising a RAN control node, the method comprising:
sending to the RAN control node, signal quality measurements performed by the UE on a downlink (DL) signal received from the WLAN control node;
sending, to the RAN control node, an identity of the WLAN control node;
receiving, from the RAN control node, an instruction to send a probe signal to the WLAN control node, and
in response receiving the instruction, sending, to the WLAN control node, the probe signal,
wherein the probe signal triggers the WLAN control node to perform a measurement on the probe signal and to determine whether to grant access based on the measurement.

5. The method of claim 4, further comprising sending, to the RAN control node, the WLAN MAC address of the UE before receiving the instruction to send the probe signal to the WLAN control node.

6. A computer program product comprising a non-transitory computer readable medium storing computer readable code for configuring a user equipment (UE) to perform the method of claim 4.

7. A method performed by a radio access network (RAN) control node in a wireless communication system comprising a Wireless Local Area Network (WLAN) and a RAN comprising the RAN control node, for efficient usage of resources in the WLAN and the RAN, the WLAN comprising a WLAN control node, the method comprising:
receiving a WLAN MAC-address of a user equipment (UE) connected to the RAN;
receiving, from the UE, DL signal quality measurements performed on a signal received from the WLAN control node;
receiving, from the UE, an identity of the WLAN control node;

sending, to the WLAN control node, the WLAN MAC address of the UE based on the identity of the WLAN control node;

sending, to the UE, an instruction to send a signal to the WLAN control node;

determining control information regarding whether or not to grant access for the UE to the WLAN, the control information being based on the received DL signal quality measurement; and sending the determined control information to the WLAN control node.

8. The method of claim 7, wherein the control information determined based on the received DL measurement is a UL measurement condition for which the WLAN control node should grant the UE access to the WLAN when the condition is fulfilled.

9. The method of claim 7, further comprising receiving, from the WLAN control node, UL signal quality measurements performed by the WLAN control node relating to signals received from the UE, and
wherein the determining of control information is based on both the UL signal quality measurements and the DL signal quality measurements.

10. The method of claim 7, further comprising sending an instruction to the WLAN control node to perform measurements on a signal received from the UE.

11. A computer program product comprising a non-transitory computer readable medium storing computer readable code for configuring a radio access network (RAN) control node to perform the method of claim 7.

12. A method performed by a Wireless Local Area Network, WLAN control node in a wireless communication system comprising a WLAN having the WLAN control node and a radio access network (RAN) for efficient usage of resources in the WLAN and the RAN, the RAN comprising a RAN control node, the method comprising:
receiving, from the RAN control node, a WLAN MAC address of a UE connected to the RAN which UE also has received a signal transmitted by the WLAN control node;
receiving a signal from the UE;
performing, uplink (UL) signal quality measurements on the signal received from the UE;
receiving, from the RAN control node, control information regarding whether or not to grant access for the UE to the WLAN, the control information being based on DL signal quality measurements performed by the UE on the signal transmitted by the WLAN control node; and
selectively granting access to the WLAN for the UE, based on the received control information and the performed UL signal quality measurements.

13. The method of claim 12, wherein the received control information is a UL measurement condition for which the WLAN control node should grant the UE access to the WLAN when the condition is fulfilled.

14. The method of claim 12, further comprising sending, to the RAN control node, the performed UL signal quality measurements, and
wherein the received control information is based on both the UL signal quality measurements and the DL signal quality measurement.

15. The method of claim 12, further comprising receiving an instruction from the RAN control node to perform measurements on the signal received from the UE.

16. A computer program product comprising a non-transitory computer readable medium storing computer readable code for configuring a Wireless Local Area Network (WLAN) control node to perform the method of claim 12.

17. A user equipment (UE) connectable to a wireless communication system comprising a Wireless Local Area Network (WLAN) comprising a WLAN control node and a radio access network (RAN) comprising a RAN control node, the UE comprising:
  a processor; and
  a memory, said memory containing instructions executable by said processor, whereby said UE is operative for:
  sending to the RAN control node, signal quality measurements performed by the UE on a downlink (DL) signal received from the WLAN control node;
  sending, to the RAN control node, an identity of the WLAN control node;
  receiving, from the RAN control node, an instruction to send to the WLAN control node a probe signal that triggers the WLAN control node to perform a measurement on the probe signal and to determine whether to grant access to the UE based on the measurement, and
  sending, to the WLAN control node, a probe signal, wherein probe signal triggers the WLAN control node to perform the measurement on the probe signal and determine whether to grant access to the UE based on the measurement.

18. The UE of claim 17, the memory further contains instructions executable by said processor whereby the UE is operative for sending, to the RAN control node, the WLAN MAC address of the UE.

19. The UE of claim 17, the memory further contains instructions executable by said processor whereby the UE is operative for performing signal quality measurements on a downlink (DL) signal received from the WLAN control node.

20. The UE of claim 17, wherein said UE is further operative for sending, to the RAN control node, the WLAN MAC address of the UE before receiving the instruction to send the probe signal to the WLAN control node.

21. A radio access network (RAN) control node in a wireless communication system comprising a Wireless Local Area Network (WLAN) comprising a WLAN control node and a RAN comprising the RAN control node, the RAN control node comprising:
  a processor; and
  a memory, said memory containing instructions executable by said processor, whereby said RAN control node is operative for:
  receiving a WLAN MAC-address of a user equipment (UE) connected to the RAN;
  receiving, from the UE, DL signal quality measurements performed on a signal received from the WLAN;
  receiving, from the UE, an identity of the WLAN control node;
  sending, to the WLAN control node, the WLAN MAC address of the UE based on the identity of the WLAN control node;
  sending, to the UE, an instruction to send a signal to the WLAN control node;
  determining control information regarding whether or not to grant access for the UE to the WLAN, the control information being based on the received DL signal quality measurement; and
  sending the determined control information to the WLAN control node.

22. The RAN control node of claim 21, wherein the control information determined based on the received DL measurement is a UL measurement condition for which the WLAN control node should grant the UE access to the WLAN when the condition is fulfilled.

23. The RAN control node of claim 21, the memory further contains instructions executable by said processor whereby the RAN control node is operative for receiving, from the WLAN control node, UL signal quality measurements performed by the WLAN control node relating to signals received from the UE, and wherein the determining of control information is based on both the UL signal quality measurements and the DL signal quality measurements.

24. The RAN control node of claim 21, the memory further contains instructions executable by said processor whereby the RAN control node is operative for sending an instruction to the WLAN control node to perform measurements on a signal received from the UE.

25. A Wireless Local Area Network (WLAN) control node in a wireless communication system comprising a WLAN comprising the WLAN control node and a Radio Access Network (RAN) comprising a RAN control node, the WLAN control node comprising:
  a processor; and
  a memory, said memory containing instructions executable by said processor, whereby said WLAN control node is operative for:
  receiving, from the RAN control node, a WLAN MAC address of a UE connected to the RAN which UE also has received a signal transmitted by the WLAN control node;
  receiving a signal from the UE;
  performing uplink (UL) signal quality measurements on the signal received from the UE;
  receiving, from the RAN control node, control information regarding whether or not to grant access for the UE to the WLAN, the control information being based on DL signal quality measurements performed by the UE on the signal transmitted by the WLAN control node; and
  selectively granting access to the WLAN for the UE, based on the received control information and the performed UL signal quality measurements.

26. The WLAN control node of claim 25, wherein the received control information is a UL measurement condition for which the WLAN control node should grant the UE access to the WLAN when the condition is fulfilled.

27. The WLAN control node of claim 25, wherein said memory further contains instructions executable by said processor, whereby said WLAN control node is operative for sending, to the RAN control node, the performed UL signal quality measurements, and wherein the received control information is based on both the UL signal quality measurements and the DL signal quality measurement.

28. The WLAN control node of claim 25, wherein said memory further contains instructions executable by said processor, whereby said WLAN control node is operative for receiving an instruction from the RAN control node to perform measurements on the signal received from the UE.

* * * * *